Nov. 3, 1936.   R. K. WARING   2,059,421
ZINC SULPHIDE
Filed Dec. 28, 1934
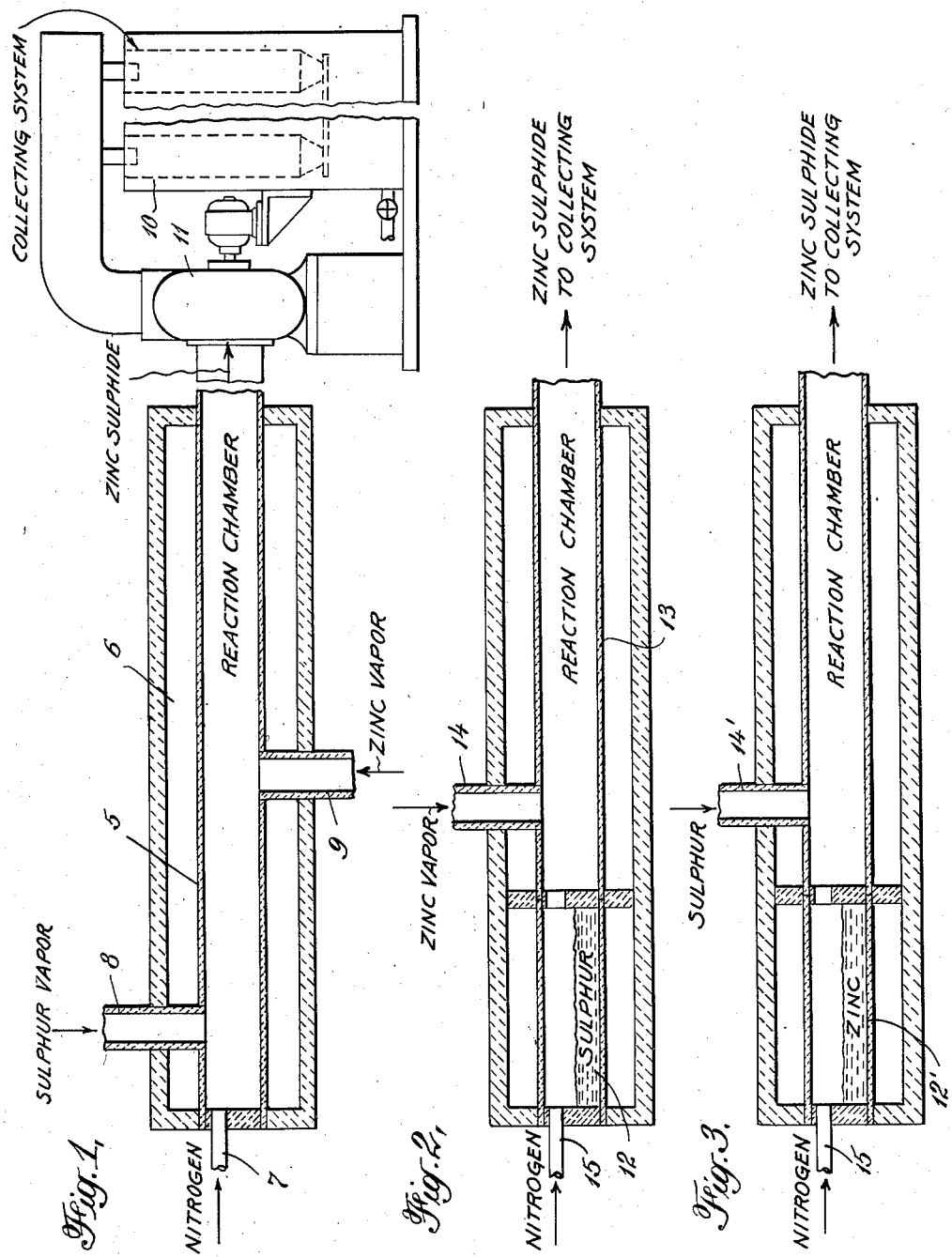
INVENTOR
Robert Kerr Waring
BY Pennie, Davis, Marvin & Edmonds
ATTORNEYS Patented Nov. 3, 1936

2,059,421

UNITED STATES PATENT OFFICE 2,059,421

ZINC SULPHIDE

Robert Kerr Waring, Palmerton, Pa., assignor to The New Jersey Zinc Company, New York, N. Y., a corporation of New Jersey Application December 28, 1934, Serial No. 759,502

19 Claims. (Cl. 23—135)

This invention relates to the manufacture of zinc sulphide pigment, and has for its object the provision of an improved method of manufacturing zinc sulphide pigment by the direct reaction of zinc vapor and sulphur vapor.

It has long been known that metallic zinc will react with sulphur to form zinc sulphide. However, the early applications of this reaction did not contemplate the production of pulverulent material adapted for use as a pigment, but rather the synthesis of minerals similar to native zinc sulphides, namely sphalerite and wurtzite. The reaction of metallic zinc vapor with sulphur vapor to form zinc sulphide pigment was later suggested by Cawley and Griffiths, but these inventors proposed merely mixing sulphur vapor with zinc vapor, without any diluent inert gas (see British Patents Nos. 1047 and 1131 of 1879 to Cawley, and Griffiths and Cawley, respectively). The production of the pigment by this method has not been found practicable and the Cawley-Griffiths method has not, to my knowledge, been adopted for the production of zinc sulphide pigment on a commercial scale.

The present invention contemplates the production of zinc sulphide in pulverulent form adapted for use as a pigment by the reaction of zinc vapor and sulphur vapor in the presence of an inert gas which acts as a diluent to hinder the growth of the zinc sulphide particles to excessive size and also serves as a carrier to transport the particles in suspension from the reaction chamber where they are formed to a collecting system.

In accordance with the invention, the zinc vapor and sulphur vapor are brought into reaction in the presence of an inert gas in any appropriate manner, as illustrated by the following examples:

(1) Metallic zinc is volatilized and the resulting vapor mixed with an inert gas such as nitrogen. Sulphur vapor is introduced into the mixed nitrogen and zinc vapor in a reaction chamber maintained at a sufficiently high temperature to insure adequate reaction velocity. The zinc sulphide resulting from the reaction of the zinc and sulphur vapors is suspended in the inert gas and may be carried thereby to an appropriate collecting system.

(2) Sulphur is volatilized and the resulting vapor mixed with an inert gas such as nitrogen, and zinc vapor is introduced into the mixed nitrogen and sulphur vapor. As in Example No. 1, the resulting zinc sulphide is suspended in the inert gas and may be transported thereby to a collecting system.

(3) Metallic zinc is volatilized and the resulting vapor mixed with a current of inert gas such as nitrogen. Sulphur in liquid form is introduced into a chamber traversed by the hot mixture of nitrogen and zinc vapor. The heat in this chamber volatilizes the liquid sulphur and produces sulphur vapor for the reaction.

The nitrogen gas or other inert gas used may, and in commercial operations usually will, originally contain a certain proportion of constituents that have an oxidizing effect on zinc vapor. Where the zinc vapor is brought into contact with the inert gas while it contains such constituents, a certain proportion of the zinc will be oxidized. Such oxidation of zinc has a tendency to discolor the pigment ultimately obtained, with consequent deterioration of its quality. If sulphur vapor is admixed with the inert gas before it comes into contact with the zinc vapor, the sulphur will react with the oxidizing gases that may be present in small amount (such as oxygen) to form sulphur compounds (such as, for example, sulphur dioxide) that are inert to zinc vapor under the operating conditions of the invention. It is, therefore, preferable, where the inert gas used contains constituents that oxidize zinc vapor, to mix sulphur vapor with the inert gas before it comes in contact with the zinc vapor.

Since gases mix only slowly by diffusion, it is desirable to produce a certain degree of turbulence of the gases in the reaction chamber where the zinc vapor and sulphur vapor are brought into reaction in the presence of the diluent inert gas, so as to accelerate the reaction by a mixing of the gases at a greater velocity than would be brought about by diffusion. This gas turbulence with resultant rapidity of mixture and reaction may be brought about by employing a narrow reaction chamber, by introducing baffles in the reaction chamber, and by other equivalent expedients.

The temperature of the reaction chamber should be high enough for zinc to have a substantial vapor pressure, though it need not be as high as the boiling point of zinc. Thus, temperatures from 600 to 935° C., in particular about 700° C., have been measured with a pyrometer in reaction chambers in which the reaction was proceeding. Since the reaction between zinc vapor and sulphur vapor is exothermic, the reaction itself supplies some of the heat necessary to maintain the reaction temperature.

A stream or current of the inert gas is preferably passed continuously through the reaction chamber. The amount of inert gas used is in part a function of the temperature at which the operation is to be carried out and in part adjustable to control the particle size of the zinc sulphide pigment to be produced. The greater the proportion of inert gas present by volume, the finer the zinc sulphide pigment will be, other conditions being the same. Moreover, the lower the temperature at which operations are carried out, the lower the vapor pressure of zinc and therefore the lower the percentage by volume of zinc vapor at which the inert gas is saturated. Thus, for example at 650° C. the vapor pressure of zinc is 27 mm. mercury. In consequence a mixture of zinc vapor and nitrogen in equilibrium at atmospheric pressure at this temperature contains 27/760 parts zinc vapor by volume or about 3.5% zinc by volume. At this low temperature and high dilution the particle size of the zinc sulphide produced is relatively small. It will be understood that the dilution can be even higher at this temperature if desired. Moreover, even if the dilution should be less so that some of the metallic zinc present in the vapor should condense to droplets of molten zinc, the reaction between the zinc vapor and the sulphur that occurs when the sulphur vapor comes in contact with the zinc vapor removes zinc vapor from the vapor phase so that the condensed droplets of molten zinc in suspension will re-evaporate if sufficient heat is supplied to the reaction chamber and the vapor thus formed will enter into the reaction with sulphur. In case the temperature of the mixture of zinc vapor and inert gas is at or above the boiling point of zinc at the pressure prevailing in the reaction chamber (which will ordinarily be substantially atmospheric pressure, though a vacuum or pressure above atmospheric may under certain circumstances be maintained therein) the zinc vapor can be mixed with diluent gas in any proportions, without condensation.

Since the boiling point of sulphur is about 445° C., the temperature of the mixture of nitrogen and zinc vapor will ordinarily be far above the boiling point of sulphur at atmospheric pressure so that the temperature does not restrict the amount of sulphur vapor that may be present without producing condensation of sulphur in the reaction chamber. However, it will ordinarily be desirable to introduce into the reaction chamber only a little more sulphur than is chemically equivalent to the zinc vapor. If a great excess of sulphur is used, the subsequent condensation and recovery of the excess sulphur may be troublesome, while if a deficit of sulphur is present, the product will be a mixture of zinc sulphide and zinc dust.

The excess sulphur used will accompany the inert gas (e. g. nitrogen) that carries the zinc sulphide to the collecting system. If the collecting system is maintained at a temperature below the dew point of sulphur in the gas mixture, this sulphur will in part condense upon the zinc sulphide collected. This can be obviated by maintaining the collecting chamber at a sufficient temperature to maintain the sulphur in vapor form, say 500° C. If this is done, when the zinc sulphide is removed from the collecting system it will be substantially free from sulphur.

In any case, the sulphur that may be present in the zinc sulphide product can be readily removed by heat treatment at adequate temperatures to expel the sulphur, with exclusion of air.

In order to obviate the risk of oxidizing a portion of the zinc sulphide produced, it may be desirable to cool the product both before removing it from the collecting system and before removing it from the heating operation to expel the sulphur, with exclusion of air. Thus a current of neutral gas may be passed over and through the zinc sulphide until it has attained a temperature not greatly in excess of room temperature.

The zinc sulphide product obtained in accordance with the present invention does not require any calcining or quenching treatment other than a heat treatment to eliminate uncombined sulphur from it. It is in the form of a finished pigment when it enters the collecting system. However, its properties may in some cases be improved by a subsequent muffling treatment.

Any conventional type of collecting system used for collecting pigment in the form of fume may be utilized to collect the product of the present invention. Thus for example the inert gas carrying the zinc sulphide pigment in suspension may be passed first through a cyclone dust collector to remove relatively coarse particles and then into settling chambers to collect particles of medium dimensions and finally into a bag room or electrostatic dust precipitator (such as a Cottrell apparatus) to collect the finest particles. Air should be excluded from the collecting system in order to obviate oxidation of the zinc sulphide and, as already pointed out, the pigment removed from the collecting system should be kept from contact with air currents until it has cooled so far that no reaction with atmospheric oxygen is to be feared. As has already been stated, the collecting system may be maintained at a sufficiently high temperature, say 500° C., to substantially eliminate sulphur from the product.

Various types and forms of apparatus may be used in practicing the invention.

Fig. 1 of the accompanying drawing illustrates diagrammatically, merely by way of example, one suitable arrangement of apparatus, and Figs. 2 and 3 diagrammatically illustrate modified arrangements of apparatus.

The apparatus of Fig. 1 comprises a long and narrow chamber 5 appropriately heat insulated or, if desired, surrounded by a heating laboratory 6 for maintaining therein the contemplated operating temperatures. Nitrogen or other suitable inert gas is introduced into one end of the chamber through a pipe 7 to maintain a continuous flow of inert gas therethrough. Sulphur vapor is introduced into the chamber through a conduit 8 approximate the pipe 7. Zinc vapor is introduced into the chamber through a conduit 9. The sulphur and zinc are separately volatilized in any suitable manner, and the resulting vapors continuously supplied to the chamber in appropriately proportioned amounts, the amount of sulphur vapor being approximately the chemical equivalent of the amount of zinc vapor. The reaction between the zinc and sulphur vapors takes place in the chamber adjacent the conduit 9 in the presence of the inert and diluent gas, and the resulting finely divided particles of zinc sulphide are carried in suspension in the inert gas stream to a suitable collecting system, being thereby cooled and separated from the carrying gas. Merely by way of example, the collecting system in Fig. 1 is shown as a hot bagroom 10 with which is operatively associated a fan 11.

In the apparatus of Fig. 2, an end portion of the long and narrow chamber is constructed as a sulphur volatilizing retort 12 and is appropriately heated in any suitable manner. The remainder 13 of the chamber, appropriately heat insulated or heated if desired, is the reaction chamber. Zinc vapor, from any appropriate source, is introduced into the reaction chamber through a conduit 14 adjacent the retort 12. Nitrogen or other suitable inert gas is introduced into the retort through a pipe 15 to maintain a continuous stream thereof through the retort and the adjacent reaction chamber. The resulting zinc sulphide is carried to the collecting system, cooled and separated from the carrying gas as hereinbefore described.

The apparatus of Fig. 3 differs from that of Fig. 2 only in that zinc is volatilized in the retort 12' and sulphur in either vapor or molten state is introduced into the reaction chamber through the conduit 14' in an amount approximately the chemical equivalent of the zinc vapor conveyed into the chamber, but preferably in slight excess. The zinc is thus volatilized in the presence of the inert carrying gas and is conveyed by the inert gas stream into the reaction zone or chamber. If the sulphur is introduced into the reaction chamber in the molten state, it is volatilized by the heat of the mixed inert gas and zinc vapor, the reaction chamber being maintained well above the boiling point of sulphur, as hereinbefore explained.

It will be understood that the process is not limited to the specific details stated above such as reaction temperatures, amount and kind of various materials and gases, etc., all of which are capable of variation which will now be apparent to those skilled in the art. Moreover, the principle and methods of the invention are not restricted to the manufacture of zinc sulphide but can be employed to produce compounds of other pigment-forming metals such as cadmium, mercury and lead with sulphur or another element of the sixth group of the periodic system such as tellurium or selenium. In general, the volatilized metal may be produced in any suitable way either by the direct volatilization of the metal in an inert atmosphere or by the reduction of various concentrates or ores under conditions such as to prevent oxidation and to provide a metallic vapor. It will also be understood that details of the process and the type and kind of apparatus used to carry out the reaction can be varied without departing from the spirit of the invention. Reference is therefore to be had to the appended claims for a definition of the limits of the invention.

I claim:

1. A method for making a finely divided pigment material of particle size suitable for use as a pigment which consists in volatilizing zinc, conveying the zinc vapor in suspension in an inert carrying gas through a reaction zone, introducing sulphur vapor into said reaction zone, and collecting the finely divided particles from the inert carrying gas after the reaction is completed.

2. A method for making a pigment in the form of finely divided particles which consists in volatilizing zinc in the presence of an inert gas, conveying the inert gas together with the metallic vapor into contact with sulphur in a reaction zone, the sulphur being volatilized by the heat of said gas and vapor, withdrawing the inert gas together with the products of reaction from said zone, and separating the products of reaction from the carrying gas.

3. A method for making zinc sulphide in pigment form which consists in volatilizing zinc in the presence of an inert carrying gas, conveying said inert carrying gas together with the metallic vapor through a reaction zone containing sulphur vapor and separating the fine particles of zinc sulphide from the carrying gas.

4. A method for making pigment zinc sulphide which consists in volatilizing zinc in the presence of an inert carrying gas, conveying said gas together with the metallic vapor to a reaction chamber, simultaneously introducing sulphur vapor into said chamber to form zinc sulphide particles, conveying said gas together with the products of reaction from said chamber, and cooling and collecting the zinc sulphide particles.

5. A method for making pigment zinc sulphide which consists in volatilizing zinc in the presence of an inert carrying gas, conveying said gas together with the metallic vapor to a reaction chamber, maintaining said reaction chamber at a temperature above the boiling point of sulphur and introducing sulphur into said chamber to be vaporized therein, conveying said inert gas and the suspended products of reaction out of said reaction chamber, and cooling and collecting said products.

6. A method for making zinc sulphide pigment which consists in volatilizing zinc in the presence of an inert gas, conveying said gas with the metallic vapor in suspension therein continuously through a reaction zone and to a collector, and mixing sulphur vapor with said gas and vapor in the reaction zone, whereby zinc sulphide particles are formed and collected in form suitable for use as a pigment.

7. A method for making zinc sulphide pigment which consists in volatilizing zinc in the presence of an inert gas, conveying said gas with the metallic vapor in suspension therein continuously through a reaction zone and to a collector, and mixing sulphur vapor with said gas and vapor in the reaction zone, while maintaining a state of turbulence therein, whereby zinc sulphide particles are formed and collected in form suitable for use as a pigment.

8. A method for making zinc sulphide pigment which consists in volatilizing zinc in the presence of an inert gas, conveying the inert gas with the zinc vapor carried in suspension therein to a reaction zone while maintaining a temperature of approximately 700° C., mixing sulphur vapor with said gas and metallic vapor in said reaction zone, whereby zinc sulphide particles are formed, and conveying said inert gas with the zinc sulphide particles in suspension therein to a collector while permitting the same to cool, whereby zinc sulphide of particle size suitable for pigment is formed.

9. A method for making pigment in finely divided form which consists in volatilizing a pigment-forming metal in the presence of an inert carrying gas, conveying said inert gas together with the suspended metallic vapor through a reaction zone and to a collector, mixing a volatilized pigment-forming element of the sixth group of the periodic system with said gas and metallic vapor in said reaction zone while maintaining the temperature in said zone high enough to vaporize said element, and collecting the finely divided particles of pigment compound from said carrying gas.

10. A method for making pigment in finely divided form which consists in volatilizing a pigment-forming metal selected from the group consisting of zinc, mercury and lead in the presence of an inert carrying gas, conveying the gas and metallic vapor to a reaction chamber, mixing with said gas and vapor a vaporized pigment-forming element selected from the group consisting of sulphur, selenium and tellurium, and conveying said gas and products of reaction from the reaction chamber and collecting the finely divided particles of pigment compound from the gas.

11. A method for making a finely divided pigment material of particle size suitable for use as a pigment which consists in volatilizing zinc, mixing the zinc vapor with an inert gas, conveying the inert gas together with the vapor through a reaction zone, introducing sulphur in quantity approximately the chemical equivalent of the zinc vapor into said reaction zone, withdrawing the inert gas together with the products of reaction from said zone and separating the products of reaction from the inert gas.

12. A method for making pigment in a finely divided form which consists in volatilizing a pigment-forming metal, mixing the vapor with an inert carrying gas, conveying said inert gas together with the suspended metallic vapor to a reaction zone, mixing a pigment-forming element of the sixth group of the periodic system with said gas and metallic vapor in said reaction zone while maintaining the temperature in said zone high enough to vaporize said element and separating the finely divided particles of pigment compound from said carrying gas.

13. A method for making a zinc sulphide pigment which consists in a vaporizing zinc, mixing the zinc vapor with an inert carrying gas, conveying said gas with the zinc vapor in suspension therein continuously through a reaction zone and to a collector, and mixing sulphur with said zinc vapor and carrying gas in said reaction zone in an amount approximately the chemical equivalent of the zinc vapor, whereby the zinc sulphide particles resulting from the reaction are rapidly cooled and separated from the inert gas in the collector.

14. A method for making zinc sulphide pigment which consists in volatilizing zinc, mixing the zinc vapor with an inert gas, conveying said gas with the zinc vapor in suspension therein continuously through a reaction zone and to a collector, mixing sulphur vapor with said zinc vapor and inert gas, the sulphur vapor being in an amount approximately the chemical equivalent of the zinc vapor, maintaining a state of turbulence in said reaction zone, and separating the zinc sulphide from the inert gas in the collector.

15. A method of making pigment zinc sulphide which comprises bringing zinc vapor and sulphur vapor into reaction in the presence of an inert gas, and separating the resulting finely divided particles of zinc sulphide from the inert gas after the reaction is completed.

16. A method of making pigment zinc sulphide which comprises introducing zinc vapor and sulphur vapor into a flowing stream of an inert gas which acts as a diluent to hinder the growth of the resulting zinc sulphide particles to excessive size and also as a carrier to transport the particles in suspension from the reacting zone where they are formed to a collecting system.

17. A method of making pigment zinc sulphide which comprises continuously introducing zinc vapor and sulphur vapor into a flowing stream of an inert gas in a reaction chamber maintained at a temperature at which said zinc and sulphur vapors readily react to form finely divided particles of zinc sulphide suspended in the inert gas stream, and transporting said zinc sulphide particles in suspension in the inert gas stream from said reaction chamber to a collecting system where the zinc sulphide particles are separated from the inert gas.

18. A method of making pigment zinc sulphide which comprises introducing zinc vapor into a mixture of sulphur vapor and inert gas under conditions resulting in the formation of finely divided particles of zinc sulphide suspended in the inert gas, and separating the resulting finely divided particles of zinc sulphide from the inert gas after the reaction is completed.

19. A method of making pigment zinc sulphide which comprises introducing sulphur vapor into a flowing stream of an inert gas, then introducing zinc vapor into the mixture of inert gas and sulphur vapor while maintaining a temperature at which said zinc and sulphur vapors readily react to form finely divided particles of zinc sulphide suspended in the inert gas stream, and transporting said zinc sulphide particles in suspension in the inert gas stream to a collecting system where the zinc sulphide particles are separated from the inert gas.

ROBERT KERR WARING.